(12) United States Patent
Abe et al.

(10) Patent No.: US 6,728,968 B1
(45) Date of Patent: Apr. 27, 2004

(54) UPWARD-JOINING-NOISE DECREASING METHOD AND APPARATUS

(75) Inventors: Kaoru Abe, Kawasaki (JP); Yuichi Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/521,655

(22) Filed: Mar. 9, 2000

(30) Foreign Application Priority Data

Jun. 17, 1999 (JP) .......................................... 11-171614

(51) Int. Cl.[7] .............................................. H04N 7/173
(52) U.S. Cl. ....................... 725/124; 725/121; 725/125; 725/126; 455/226.3; 348/193
(58) Field of Search ........................ 455/63, 67.1, 67.3, 455/67.4, 226.1, 226.2, 226.3; 725/121, 124, 125, 126; 348/192, 193

(56) References Cited

U.S. PATENT DOCUMENTS

| | | | | |
|---|---|---|---|---|
| 3,835,393 A | * | 9/1974 | Marron ........................ 325/308 |
| 5,719,792 A | * | 2/1998 | Bush | |
| 5,893,024 A | * | 4/1999 | Sanders et al. | |
| 5,937,330 A | * | 8/1999 | Vince et al. | |
| 5,982,235 A | * | 11/1999 | Kinomura ................... 330/279 |
| 6,131,014 A | * | 10/2000 | Nishimura | |
| 6,160,990 A | * | 12/2000 | Kobayashi et al. | |
| 6,201,795 B1 | * | 3/2001 | Baum et al. | |

FOREIGN PATENT DOCUMENTS

| | | |
|---|---|---|
| JP | 4-113792 | 4/1992 |
| JP | 7-307937 | 11/1995 |

\* cited by examiner

*Primary Examiner*—Vivek Srivastava
*Assistant Examiner*—Ngoc Vu
(74) *Attorney, Agent, or Firm*—Katten Muchin Zavis Rosenman

(57) ABSTRACT

A method for decreasing upward-joining-noise in an upward-signal-inputting position of a center device includes the steps of: measuring a noise level of each of a plurality of upward signals supplied from a plurality of transmission lines; determining whether the measured noise level of each upward signal is low enough or not; and based on a determination result, controlling and adjusting a level of each upward signal. Therefore, the level of an upward signal, for which the noise level of the upward signal is determined to be low enough, is adjusted higher but still kept at a level low enough not to interfere with upward signals from other transmission lines.

12 Claims, 14 Drawing Sheets

UPWARD-JOINING-NOISE DECREASING METHOD AND APPARATUS

BACKGROUND OF THE INVENTION

1. Field of the Invention

The present invention relates to upward-joining-noise decreasing methods and apparatuses, and more particularly to an upward-joining-noise decreasing method and an apparatus for decreasing noise of upward signals used in two-way communication services of a CATV (cable television) transmission system.

2. Description of the Related Art

FIG. 1 is a diagram showing a conventional frequency spectrum of some ordinary upward signals used in two-way communication services of a CATV transmission system. As may be seen from this diagram, an upward-date-communication signal, which may be used in the two-way communication services such as the Internet, is transmitted within a band ranging from 30 to 36 MHz, and an upward-video signal, which may be used in a television broadcasting or the like, is transmitted within a band ranging between 36 to 42 MHz. In addition, a pilot signal, which serves to automatically adjust the gain of a transmission-line amplifier as a reference signal, is transmitted within a narrow band centered on approximately 48 MHz, and an STM (status monitoring) signal, which serves to monitor the state of a transmission-line amplifier at a center device as a response signal of a status monitor system, is transmitted within a band ranging from 54 to 55 MHz.

FIG. 2 is a diagram showing an example of the conventional CATV transmission system. As may be seen from this diagram, there are a plurality of CATV transmission lines 10A, 10B, . . . , 10X, each of which may, if necessary, be provided with a plurality of transmission-line amplifiers 12 which are respectively coupled to a plurality of subscriber terminals 14. Upward signals transmitted by the respective transmission lines 10A, 10B, . . . ,10X are mixed at a head-end device 16 in which a mixed signal is generated therefrom and then supplied to a center device 18.

In general, the upward-video signal for television broadcasting is transmitted to the center device 18 from a transmitting terminal (upward television modulator) provided on a CATV transmission line, for example, 10A. In this case, since communications between the center device 18 and the transmission terminal is "one-to-one" communications, it can be performed by using only one transmission line connected therebetween. For this reason, the influence of noise upon upward signals from the transmission line is minimal and ignored.

In contrast, in a case of the two-way data communication system, in order to perform communications from subscriber terminals provided in subscriber houses, the system should be configured such that the center device 18 (one device) can cope with a number N of the subscriber terminals 14 (N devices), namely, an "one-to-N" system. In this case, since upward signals from all of the transmission lines 10A, 10B, . . . , 10X are concentrated on the center device 18, noise contained in these upward signals are all concentrated thereon as well.

Thereby, even though the noise coming from one transmission line may be too small to be worried about, noise coming from a plurality of the transmission lines can become upward-joining noise with a level high enough to interfere with communications on these transmission lines.

For this reason, there is a problem that if noise coming from one transmission line is increased during communications on this transmission line, it may interfere with communications of all the other transmission lines. Further, in general, the lower the frequency band becomes, the larger the upward-joining noise contained therein becomes. Therefore, the frequency band to be used in communications is usually restricted to be medium or high.

In order to solve the above-mentioned problem, conventionally, when noise from a certain transmission line increases, the center device 18 measures noise from each transmission line so as to identify from which transmission line the noise has increased.

Also, a transmission-line-correction method, as a method for suppressing noise generated on the transmission lines, is provided in which a status monitoring device (STM device) is used to close a gate corresponding to a transmission line on which noise is being generated so as to interrupt upward signals therefrom. The transmission line correction method determines the locations of noise sources on a specified transmission line so as to correct the specified transmission line.

The method using the STM device may be understood with reference to FIG. 3. FIG. 3 is a diagram showing a conventional CATV transmission system using the STM device. As may be seen from this diagram, the transmission lines 10A, 10B and 10C have a transmission-line amplifier 20 provided at a junction thereof, which includes a gate with respect to these transmission lines 10A through 10C. And a CATV center has an STM device 24 and the center device 18 which are coupled to the head-end apparatus 16. When the STM device 24 determines that the noise from the line 10A is increased according to a status signal supplied by the transmission-line amplifier 20, it controls the gate thereof so that the gate is closed only to the transmission line 10A and opened for the transmission lines 10B and 10C.

Recently, a communication establishing method has been provided in which a tap-off-connection portion is provided on the side of each subscriber terminal with a gate which is closed before communications. When the subscriber terminal transmits a specific signal for communications to the tap-off-connection portion, the tap-off-connection receives the specific signal and then switches the gate ON, and communication from the subscriber terminal to the center device is thus established. Accordingly, seen from the center device, the gate of only one transmission line is switched ON at any time, and thereby an increase in noise due to a mixture of upward signals from a plurality of transmission lines can be prevented.

Further, a conventional system is provided which comprises a switching device provided immediately before the center device so as to communicate with subscriber terminals while switching transmission lines connected between the center device and the subscriber terminals. According to this system, when the center device communicates with the subscriber terminals by means of the switching device, only one transmission line can be coupled to the center device at a time, therefore preventing noise coming from a plurality of transmission lines being added together and then being supplied to the center device.

However, it takes much time and labor to determine on which transmission line the noise is increased by means of the center device. Herein, if the noise on a certain transmission line increases due to its deterioration with age, it is easy to determine the transmission line by measuring habitual noise. But, if the noise thereon is increased due to a transient cause, it is difficult and time-consuming to determine the transmission line by the above-mentioned conventional method.

With respect to the transmission-line-correction method, there is a problem that communication services on a transmission line to be corrected must be interrupted for a given time during the correction. Also, with respect to the method using the STM device, there is a problem that the two-way communication is available for the lines 10B and 10C and is unavailable for the line 10A which has to be corrected separately.

With respect to the method in which the gate is provided in the tap-off-connection portion, since the gate has to be opened during communications, it is necessary to transmit/receive a gate-ON signal besides information about the communications, that is, additional information about the gate-ON signal has to be processed. For this reason, it takes time to turn the gate ON/OFF and this may result in degradation in the communication of the upward signals. Further, there is a problem that the upward-joining noise generated on each transmission line interferes with the communications until the transmission line is corrected.

With respect to the method in which the switching device is provided immediately before the center device, in fact, a level of the noise cannot be decreased by switching the transmission lines only one of which is coupled to the center device at a time. For this reason, in a case where large noise is generated on the transmission line which is coupled to the center device, the influence of the noise upon communication services performed on the transmission line cannot be prevented and results in a deterioration of the communication services.

SUMMARY OF THE INVENTION

It is a general object of the present invention to provide an upward-joining-noise decreasing method and apparatus, in which the above disadvantages are eliminated.

Another and more specific object of the present invention is to provide a method for decreasing upward-joining-noise in a two-way communication system connected by a plurality of transmission lines between a center device and a plurality of subscriber terminals, said upward-joining-noise decreasing method comprising the steps of:

in an upward-signal-inputting position of said center device,
  (a) measuring a noise level of each of a plurality of upward signals supplied from the plurality of transmission lines;
  (b) determining whether said measured noise level of said each upward signal is low enough or not;
  (c) controlling a level of said each upward signal based on a result obtained from said determining step (b); and
  (d) adjusting said level of said each upward signal according to said controlling step (c).

Still another object of the present invention is to provide a method for decreasing upward-joining-noise in a two-way communication system connected by a plurality of transmission lines between a center device and a plurality of subscriber terminals, said upward-joining-noise decreasing method comprising the steps of:

at a plurality of transmission-line amplifiers provided on the plurality of transmission lines,
  (a) measuring a noise level of each of a plurality of upward signals supplied from the plurality of transmission lines and the plurality of subscriber terminals;
  (b) determining whether said measured noise level of said each upward signal is low enough or not;
  (c) controlling a level of said each upward signal based on a result obtained from said determining step (b); and
  (d) adjusting said level of said each upward signal according to said controlling step (c).

Still another object of the present invention is to provide an upward-joining-noise decreasing apparatus used in a two-way communication system connected by a plurality of transmission lines between a center device and a plurality of subscriber terminals, said upward-joining-noise decreasing apparatus, which is mounted in an upward-signal-inputting position of said center device, comprising:

a plurality of level measuring portions, each for measuring a noise level of each of a plurality of upward signals supplied from the plurality of transmission lines;

a level determining portion for determining whether said measured noise level of said each upward signal is low enough or not;

a level control portion for controlling a level of said each upward signal based on a result obtained from said level determining portion; and a plurality of level adjusting portions, each for adjusting said level of said each upward signal according to said level control portion.

Still another object of the present invention is to provide an upward-joining-noise decreasing apparatus used in a two-way communication system connected by a plurality of transmission lines between a center device and a plurality of subscriber terminals, said upward-joining-noise decreasing apparatus, which is provided in each of a plurality of transmission-line amplifiers provided on the plurality of transmission lines, comprising:

a plurality of level measuring portions, each for measuring a noise level of each of a plurality of upward signals supplied from the plurality of transmission lines and the plurality of subscriber terminals;

a level determining portion for determining whether said measured noise level of said each upward signal is low enough or not;

a level control portion for controlling a level of said each upward signal based on a result obtained from said level determining portion; and a plurality of level adjusting portions, each for adjusting said level of said each upward signal according to said level control portion.

Other objects, features and advantages of the present invention will become more apparent from the following detailed description when read in conjunction with the accompanying drawings.

BRIEF DESCRIPTION OF THE DRAWINGS

FIG. 12 is block diagram showing one embodiment of a transmission-line amplifier which the upward-joining-noise decreasing apparatus of the present invention is built in;

DETAILED DESCRIPTION OF THE PREFERRED EMBODIMENTS

In the following, preferred embodiments of the present invention will be described with reference to the accompanying drawings.

Figure 1:
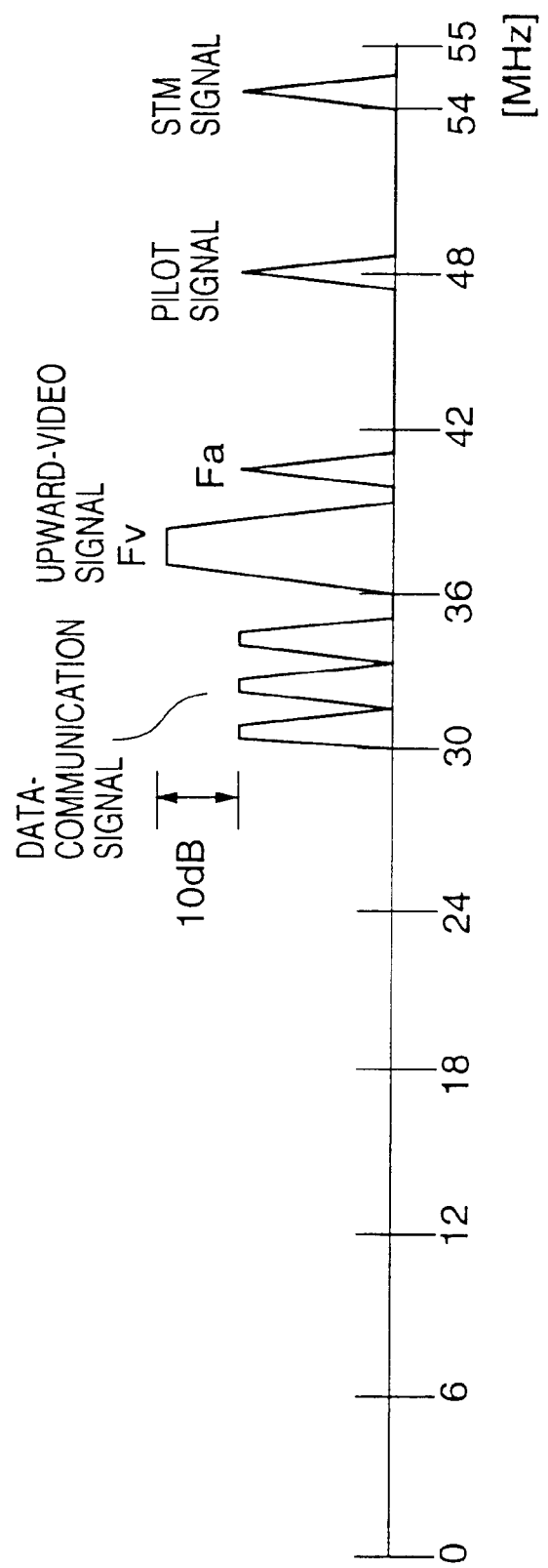
FIG. 1 is a diagram showing a conventional frequency spectrum of some upward signals used in two-way communications of a CATV transmission system, for example.
Figure 2:
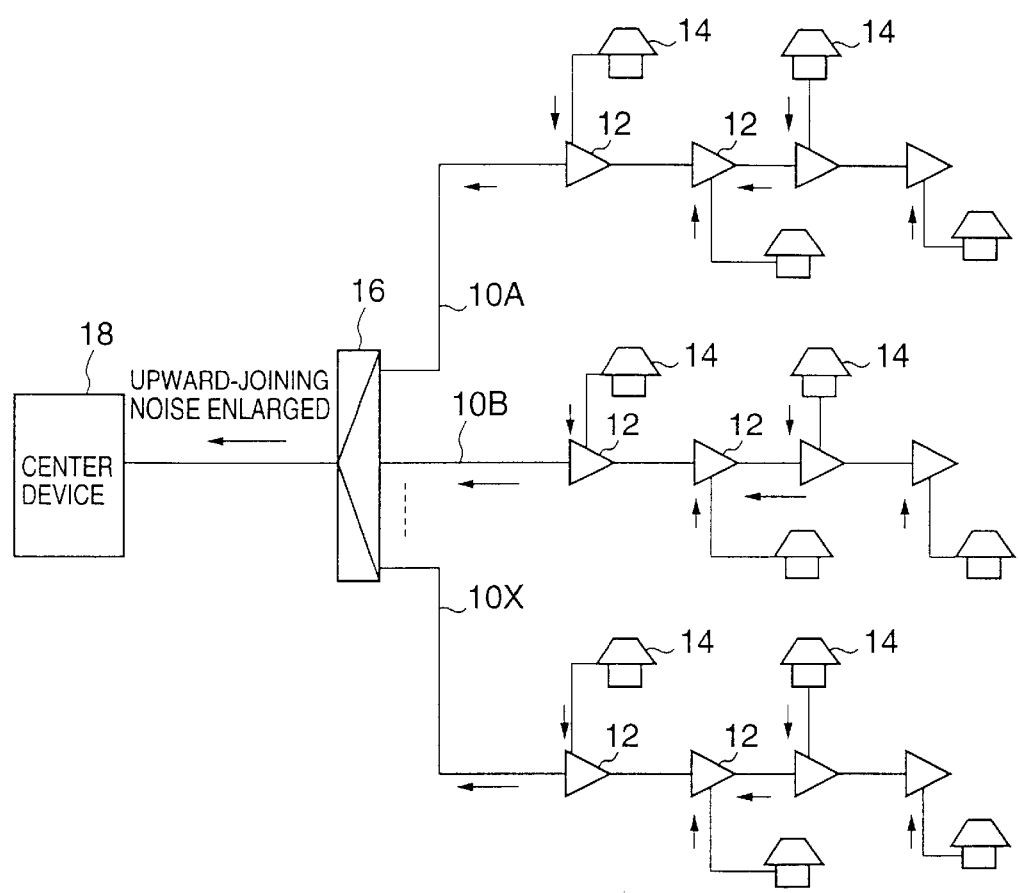
FIG. 2 is a diagram showing an example of the conventional CATV transmission system.
Figure 3:
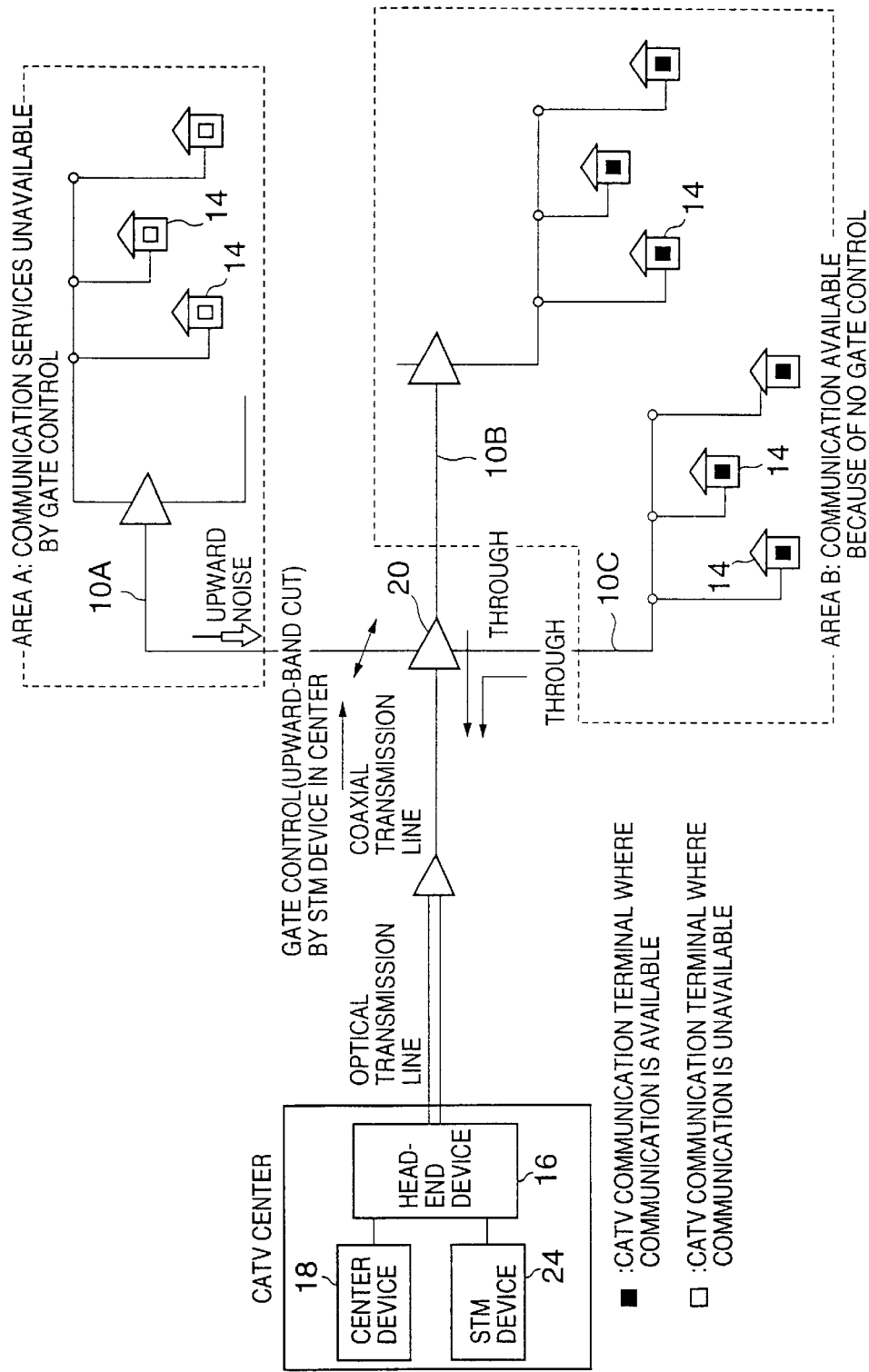
FIG. 3 is a diagram showing a conventional CATV transmission system using an STM device.
Figure 4:
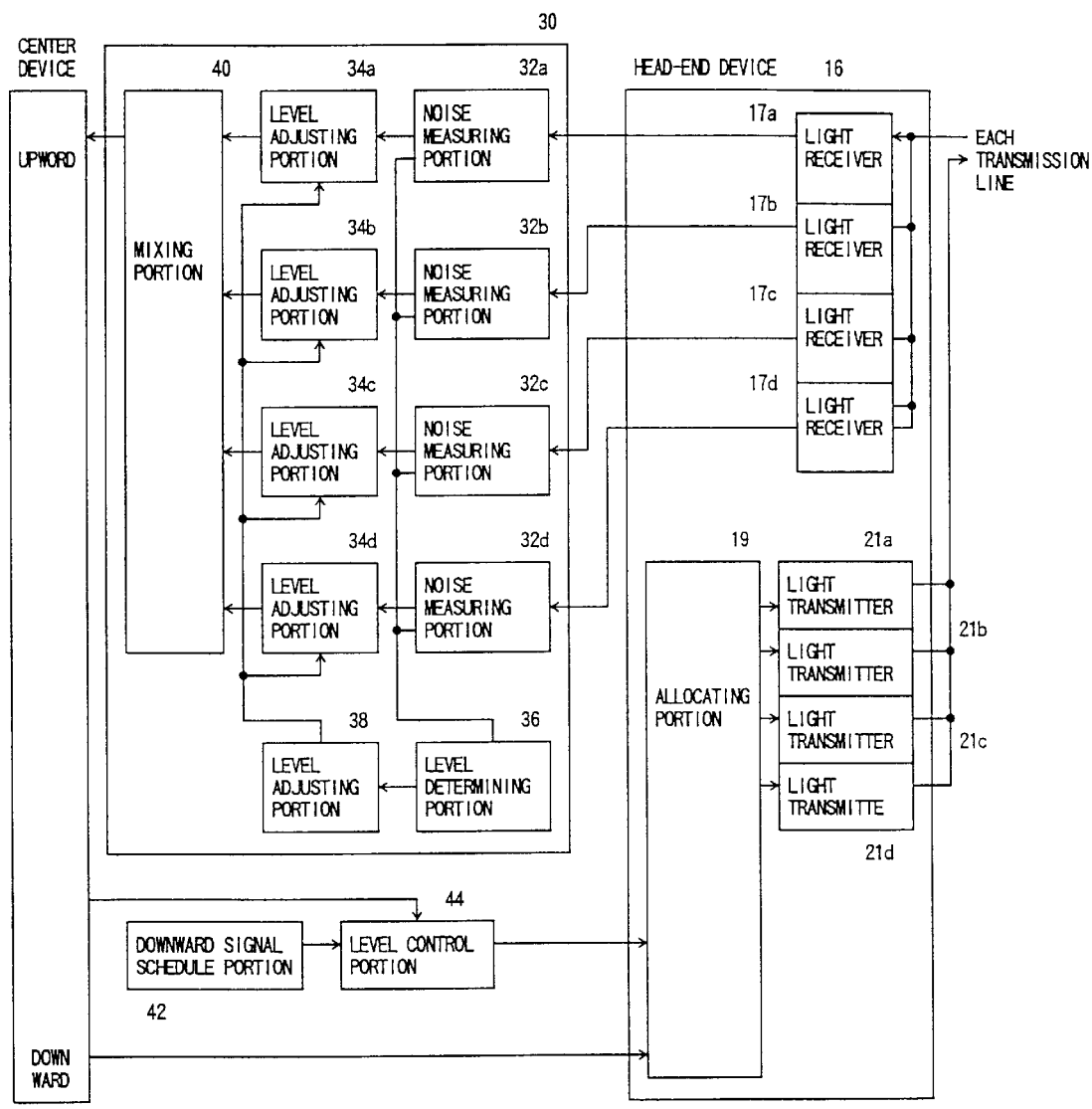
FIG. 4 is a block diagram showing one embodiment of an upward-joining-noise decreasing apparatus according to the present invention.

FIG. 4 is a block diagram showing one embodiment of an upward-joining-noise decreasing apparatus used in a CATV transmission system according to the present invention. In this diagram, parts, which are the same as those of FIG. 2, are given the same reference numerals.

As shown in FIG. 4, in a CATV center, there is an upward-joining-noise decreasing apparatus 30 provided on upward transmission lines between the head-end apparatus 16 and the center device 18. The head-end apparatus 16 includes a plurality of light receivers 17a through 17d provided therein, which receive and convert upward signals from respective transmission lines from optical signals into electrical signals and then respectively supply them to a plurality of noise measuring portions 32a through 32d provided in the upward-joining-noise decreasing apparatus 30.

The plurality of noise measuring portions 32a through 32d measure DU ratios (desired to undesired signal ratios) of the supplied upward signals so as to send the measured DU ratios to a level determining portion 36, and at the same time respectively forward these upward signals to a plurality of level adjusting portions 34a through 34d.

Then, the level determining portion 36 generates and supplies level control signals, for controlling levels of the respective upward signals, to a level control portion 38. The level control portion 38, according to these level control signals, respectively controls the level adjusting portions 34a through 34d so as to adjust the levels of the respective upward signals. Thereafter, the upward signals outputted therefrom are supplied to a mixing portion 40 which mixes them into and supplies a mixed signal to the center device 18.

The CATV transmission system in this embodiment may be configured as shown in FIG. 2. According to existing functions thereof, a level control portion 44 controls each subscriber terminal 14 so that a level of an upward signal outputted therefrom is at a predetermined level when the upward signal reaches the center device 18.

A downward-signal schedule portion 42 indicates a timing to the level control portion 44, which, under the control of the center device 18, generates a control signal for adjusting an output level of a specified subscriber terminal 14 and supplies the control signal to an allocating portion 19 according to the timing indicated by the downward-signal schedule portion 42. The allocating portion 19 mixes a downward signal supplied from the center device 18 and the control signal into a mixed signal and allocates the mixed signal to a plurality of light transmitters 21a through 21d as shown in FIG. 4.

Figure 5:
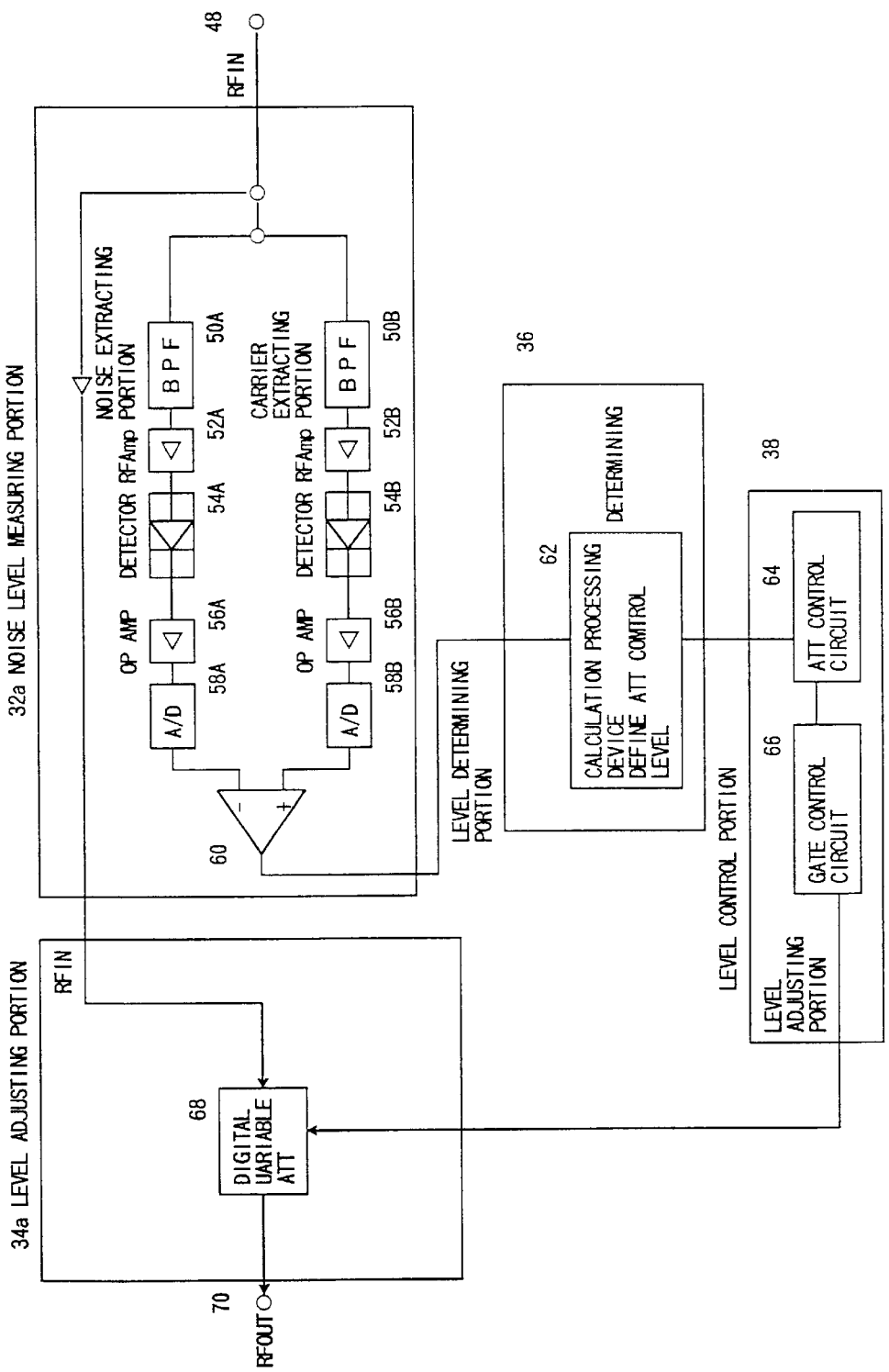
FIG. 5 is a block diagram showing a part of the upward-joining-noise decreasing apparatus of FIG. 4.

FIG. 5 is a block diagram showing a part of the upward joining noise decreasing apparatus. In this diagram, an upward signal supplied by a terminal 48 is transmitted to both of a noise extracting portion 50A and a carrier extracting portion 50B which are provided in a noise-level measuring portion 32a. The noise extracting portion 50A serves to extract the band of a noise component A shown by a frequency spectrum in FIG. 6. The noise component A is amplified by an RF amplifier 52A and then detected by a wave detector 54A, from which a detected output passes through an amplifier 56A and enters an A/D converter 58A where the detected output is digitized and then is supplied to a subtracter 60.

Figure 6:
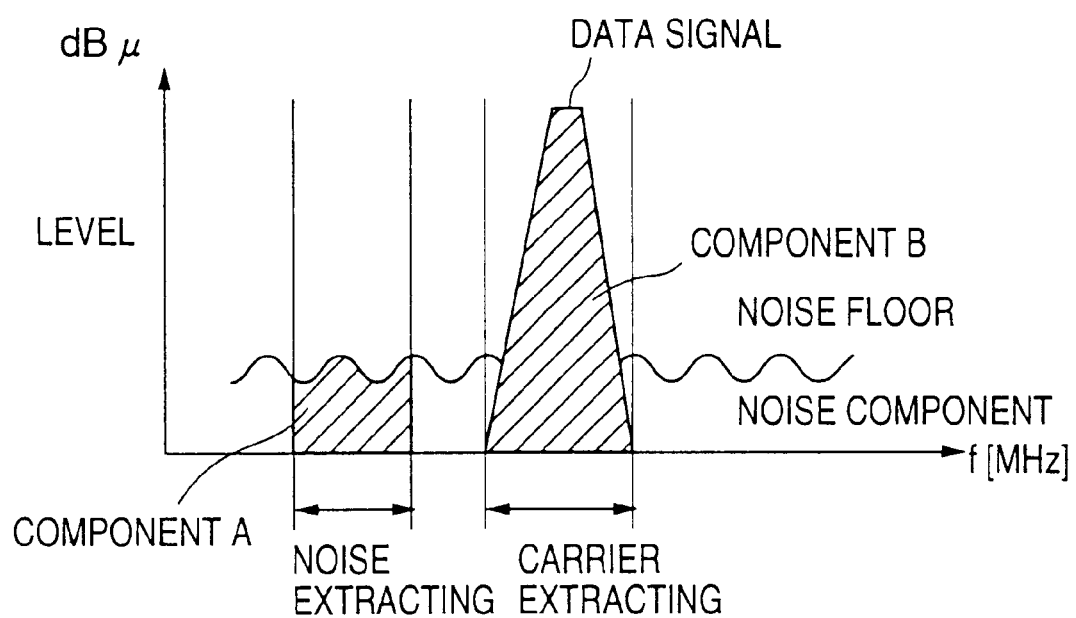
FIG. 6 shows a frequency spectrum of carrier and noise.

On the other hand, the carrier extracting portion 50B serves to extract the band of a carrier component B shown by the frequency spectrum in FIG. 6. The carrier component B is amplified by an RF amplifier 52B and then detected by a wave detector 54B, from which a detected output passes through an amplifier 56B and enters an A/D converter 58B where the detected output is digitized and then is supplied to the subtracter 60.

The subtracter 60 subtracts a digital noise level from a digital carrier level and supplies a subtracted result as a DU value to a calculation processing unit 62 of the level determining portion 36.

The calculation processing unit 62 performs a process to be described later so as to define and supply an attenuation control level to an attenuation control circuit of the level control portion 38. The attenuation control circuit 64 generates a gate control signal according to the attenuation control signal. A gate control circuit 66 switches a gate within a digital variable attenuator 68 of the level adjusting portion 34a according to the gate control signal, so as to adjust a level of the upward signal from the terminal 48. Herein, the upward signal is outputted to the mixing portion 40 via a terminal 70 after the level thereof is adjusted in the level adjusting portion 34a.

Figure 7:
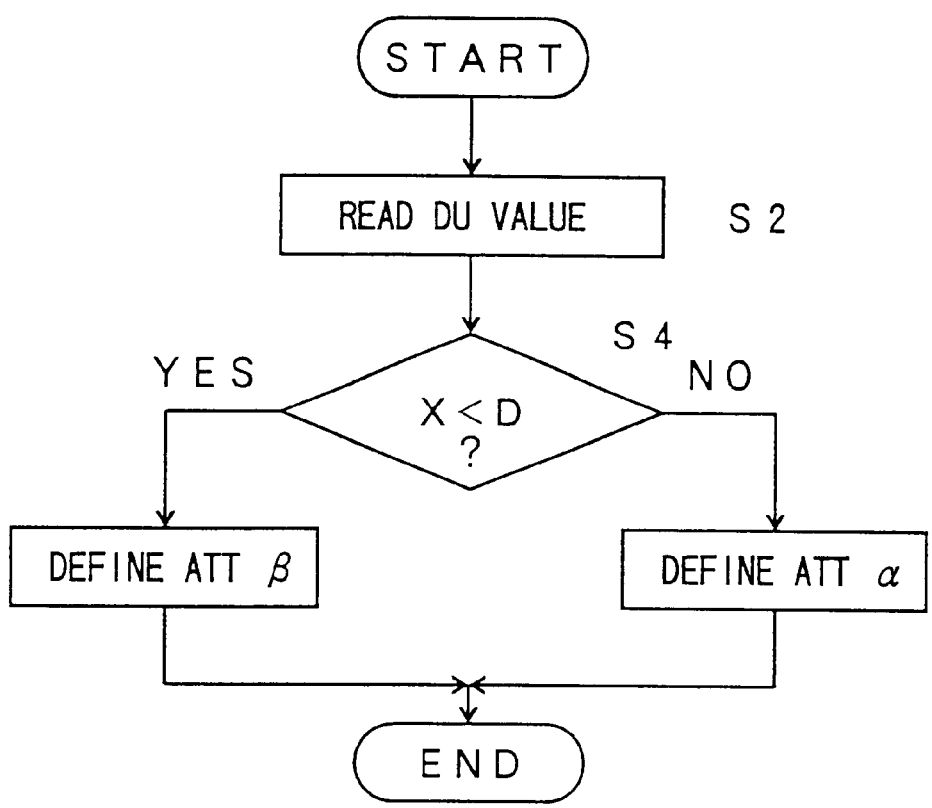
FIG. 7 is a flowchart illustrating a first embodiment of a level adjusting process performed by a level determining portion and a level control portion performing.

FIG. 7 is a flowchart illustrating a first embodiment of a level adjusting process performed by the level determining portion 36 and the level control portion 38. And FIG. 8 is a sequence diagram showing the level adjusting process which is performed at a predetermined time.

As shown in FIG. 7, at Step 2 (S2), a DU value X supplied from the subtracter 60 is read; at Step 4 (S4), the DU value X is compared with a reference defined value D so that it can be determined whether the DU value is proper or not.

Herein, if X<D, the DU value is too low, and therefore the process goes to Step 6 so as to set attenuation of the digital variable attenuator 68 to a fixed value β larger than an ordinary value α, and then the process ends. If X≧D, on the other hand, the DU value is proper, and therefore the process goes to Step 8 so as to set the attenuation of the digital variable attenuator 68 to the ordinary fixed value α and then the process ends.

Figure 8:
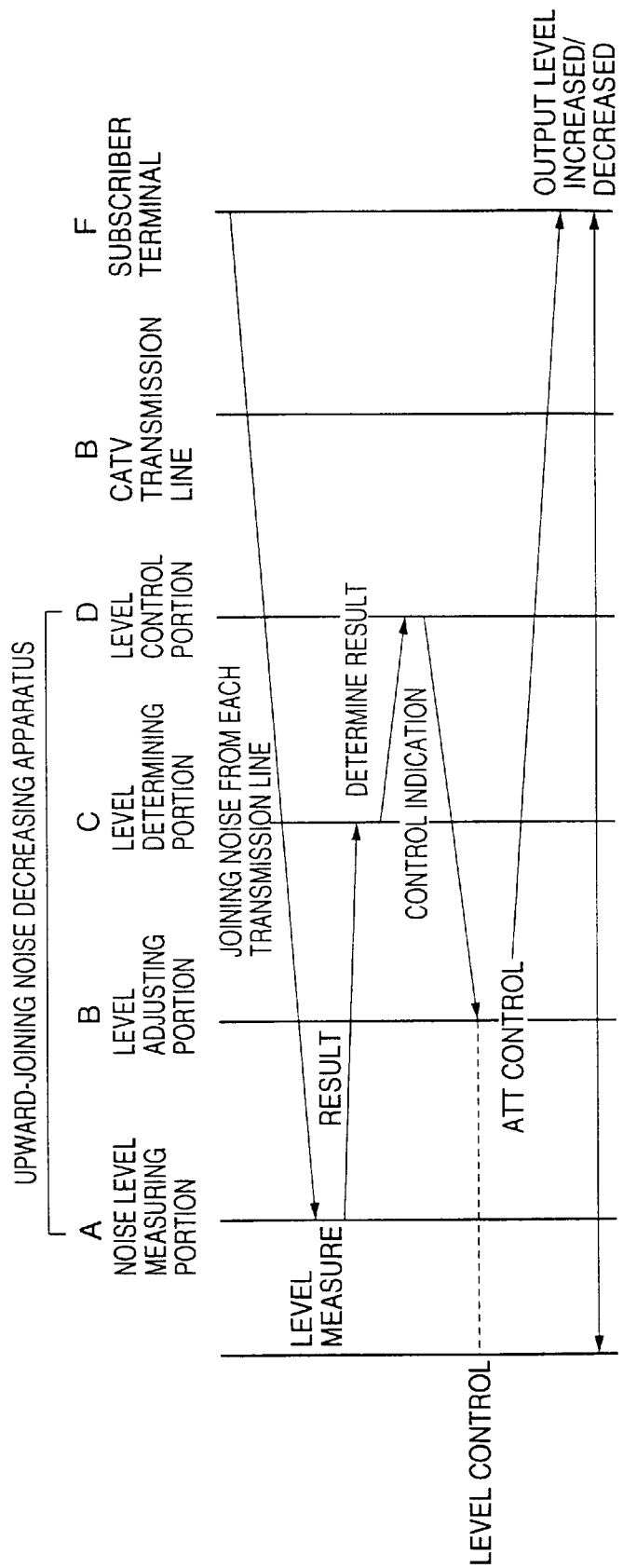
FIG. 8 is a sequence diagram showing of the level adjusting process of FIG. 7.

After that, as shown in the sequence of the level adjusting process of FIG. 8, the center device 18 adjusts an output level of the upward signal of each subscriber terminal 14 so that an arrival level of the upward signal will be at a proper level when the upward signal arrives at the center device 18.

Figure 9:
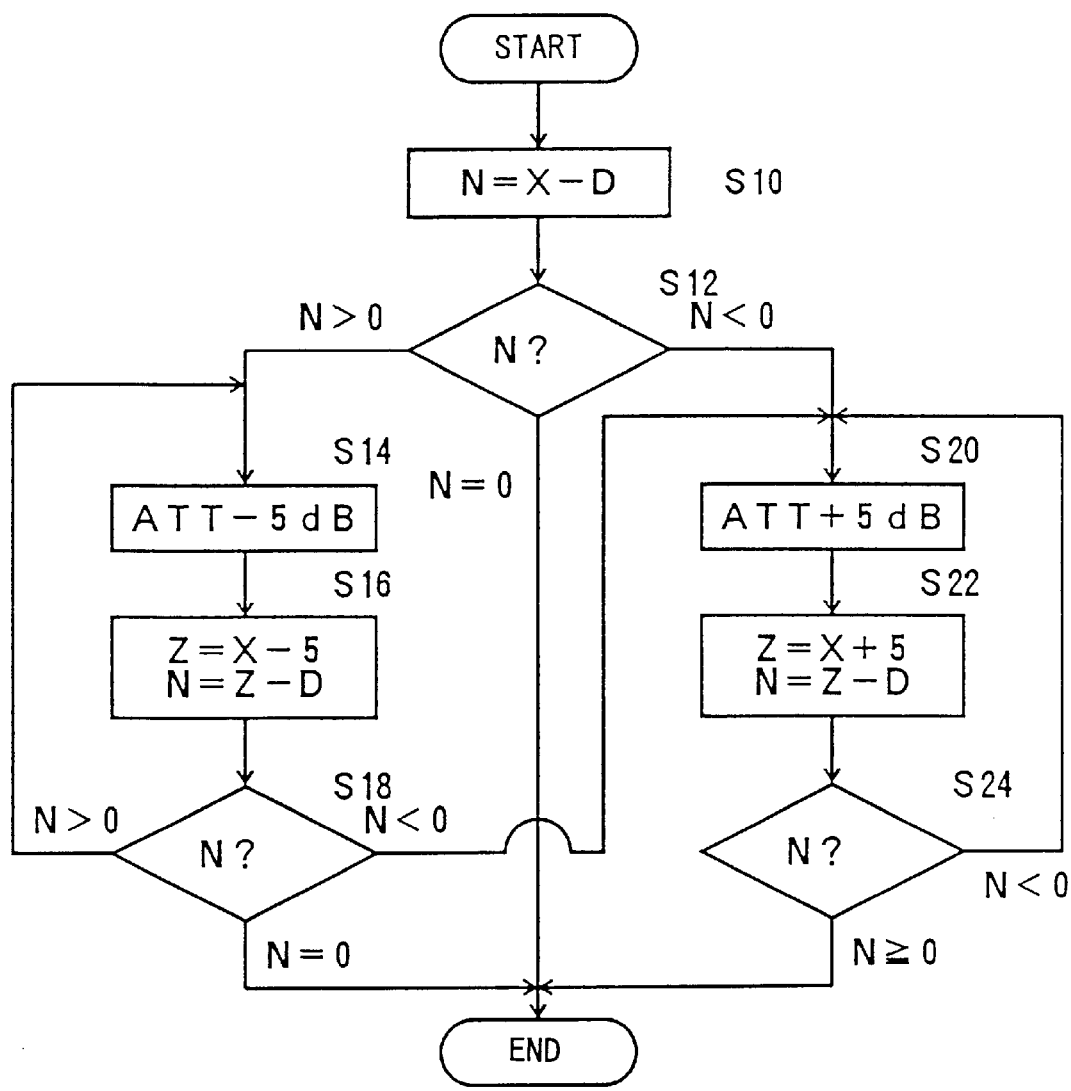
FIG. 9 is a flowchart illustrating a second embodiment of a level adjusting process performed by the level determining portion and the level control portion.
Figure 10:
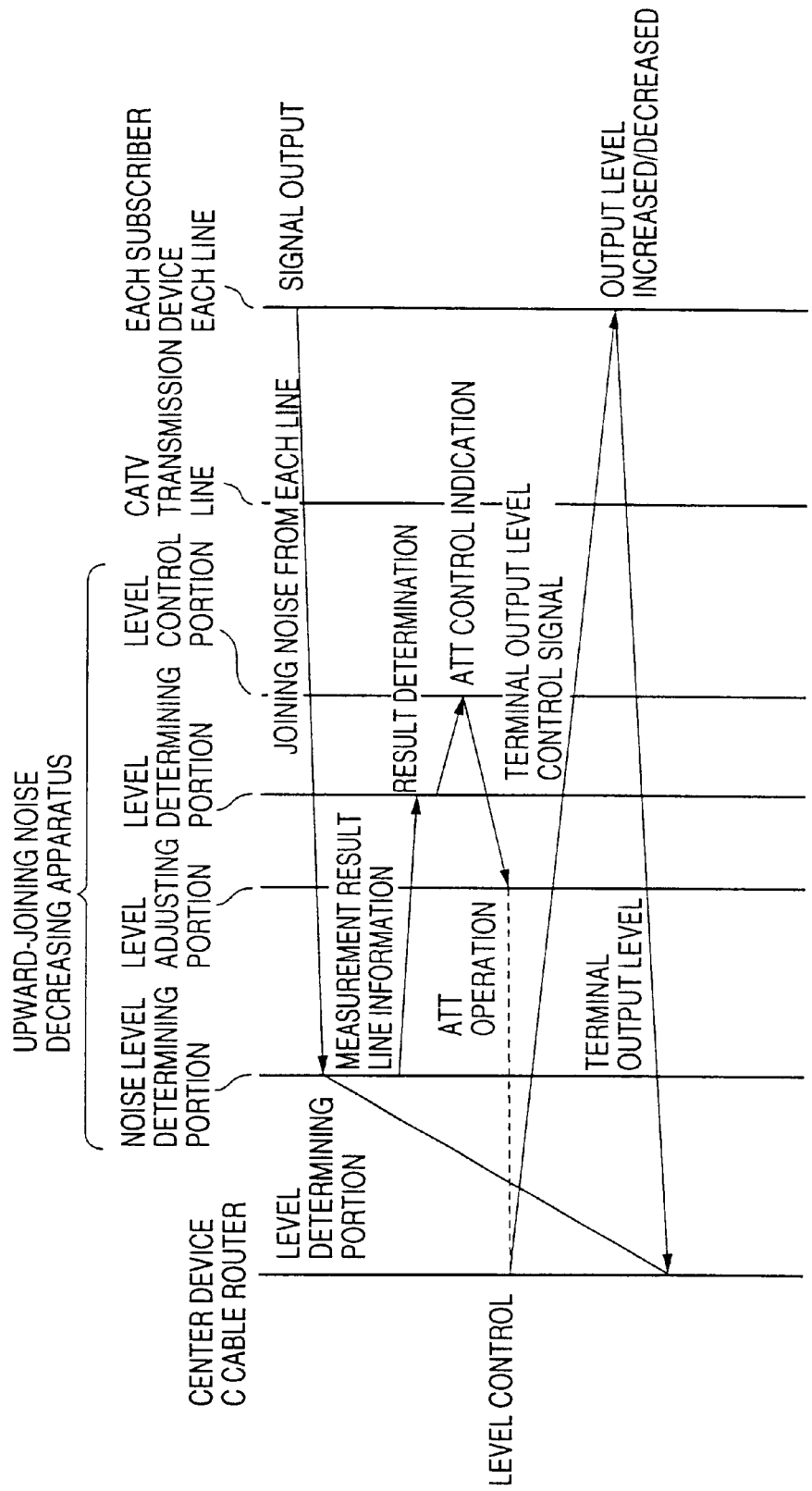
FIG. 10 is a sequence diagram showing the level adjusting process of FIG. 9.

FIG. 9 is a flowchart illustrating a second embodiment of the level adjusting process performed by the level determining portion 36 and the level control portion 38. And FIG. 10 is a sequence diagram showing the level adjusting process of FIG. 9, which is performed at a predetermined time.

As shown in FIG. 9, at Step 10, the DU value X supplied from the subtracter 60 is read so that a determining value N can be obtained by subtracting the reference defined value D from the DU value X. Next, at Step 12, the determining value N is compared with 0; if N>0, then the DU value is too high and the process goes to Step 14; if N<0, then the DU value is too low and the process goes to Step 20; and if N=0, then the DU value is proper and the process ends.

At Step 14, a control of decreasing the attenuation of the digital variable ATT 68 by 5dB (the output level of the digital variable ATT 68, including noise, is increased by 5 dB) is performed. At Step 16, a value Z is obtained by subtracting 5 from the DU value X and a new determining value N is obtained by subtracting a reference value D from the value Z. At Step 18, the determining value N is compared with 0; if N>0, then the DU value is too high and the process goes to Step 14; if N<0, then the DU value is too low and the process goes to Step 20; and if N=0, then the DU value is proper and the process ends.

At Step 20, a control of increasing the attenuation of the digital variable ATT 68 by 5 dB (the output level of the digital variable ATT 68, including noise, is decreased by 5 dB) is performed. At Step 22, a value Z is obtained by adding 5 to the DU value X and a new determining value N is obtained by subtracting the reference value D from the value Z. At Step 24, the determining value N is compared with 0; if N<0, then the DU value is too low and the process goes to Step 20; and if not, then the process ends.

By performing the process, the attenuation of the digital variable ATT 68 is set so that the DU ratio of the upward signal approximately becomes a proper value. After that, as shown in the sequence of the level adjusting process of FIG. 10, the center device 18 adjusts the output level of every subscriber terminal 14 so that an arrival level of the upward signal of the subscriber terminal 14 is at a proper level when the upward signal arrives at the center device 18.

Figure 11:
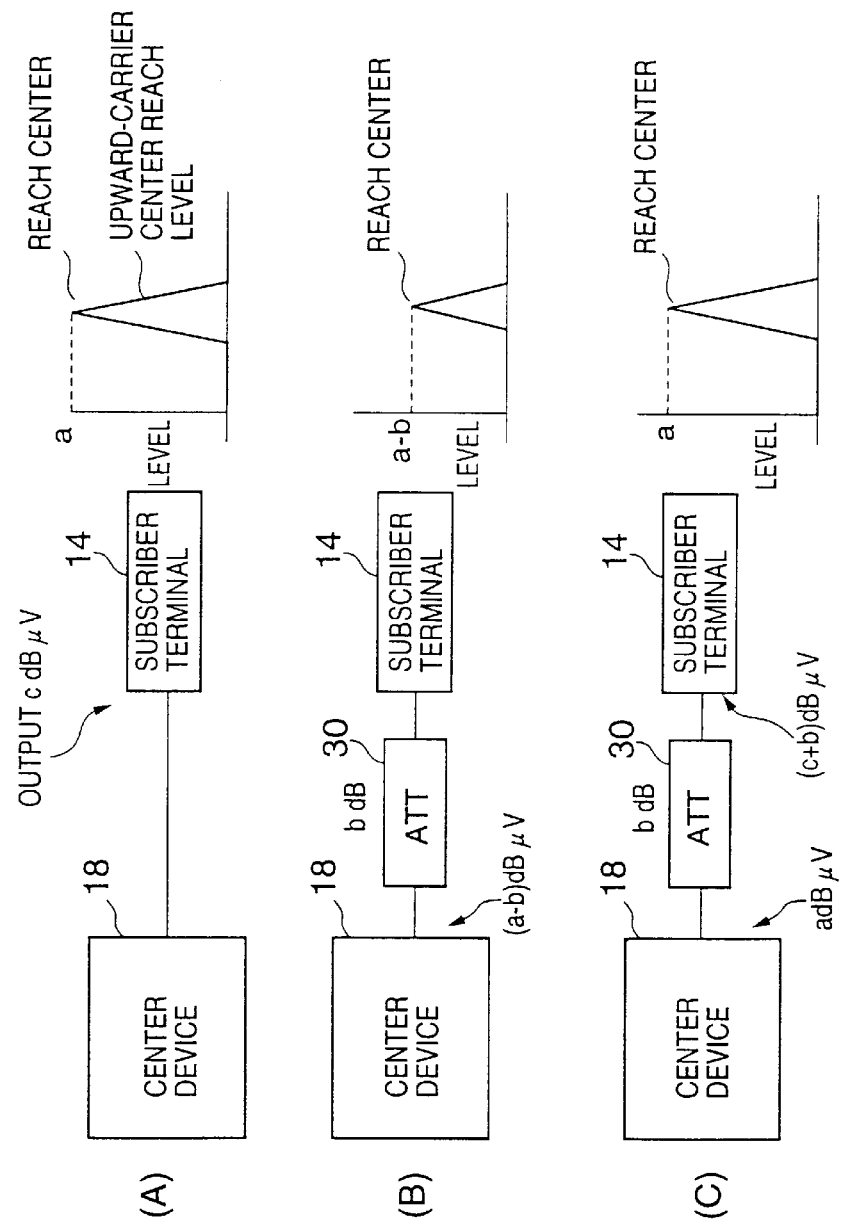
FIGS. 11A through 11C are diagrams illustrating actions of the second embodiment of the level adjusting process.

For example, as shown in FIG. 11A, the output level of the upward signal in the subscriber terminal 14 is c[dBμV], the arrival level of the upward signal carrier at the time of arriving in the center device 18 is a proper value a[dBμV].

In such a state, if the DU ratio in a transmission line between the subscriber terminal 14 and the upward-joining-noise decreasing apparatus 30 becomes worse, the noise thereon becomes larger. As shown in FIG. 11B, when an attenuation of b [dB] is performed at the upward-joining-noise decreasing apparatus 30, the arrival level of the upward signal carrier at the time of arriving in the center device 18 becomes (a−b)[dBμV].

Thus, the center device 18 sends the subscriber terminal 14 a control signal for increasing the output level thereof only by b [dB], because the arrival level of the upward signal thereof is decreased from the proper value of a[dBμV] to the value of (a−b)[dBμV]. Thereby, as shown in FIG. 11C, when the output level of the subscriber terminal 14 is increased from c[dBμV] to (c+b)[dBμV], the arrival level of the upward signal carrier arriving in the center device 18 becomes a[dBμV].

In contrast, by correcting the transmission line, from a state shown in FIG. 11C, when the DU ratio in the transmission line between the subscriber terminal 14 and the upward-joining-noise decreasing apparatus 30 is increased above the proper value, the attenuation in the upward-joining-noise decreasing apparatus 30 is decreased and the arrival level of the upward signal carrier arriving in the center device 18 is increased. Thereby, the center device 18 supplies the subscriber terminal 14 a control signal for decreasing the output level so that the output level of the subscriber terminal 14 is decreased and is returned to the original state shown in FIG. 11C.

Accordingly, the DU ratio of the transmission line between the subscriber terminal 14 and the upward-joining-noise decreasing apparatus 30 is automatically adjusted to the proper value, and the joining noise can be prevented from interfering with the communications service of all of the transmission lines.

Figure 12:
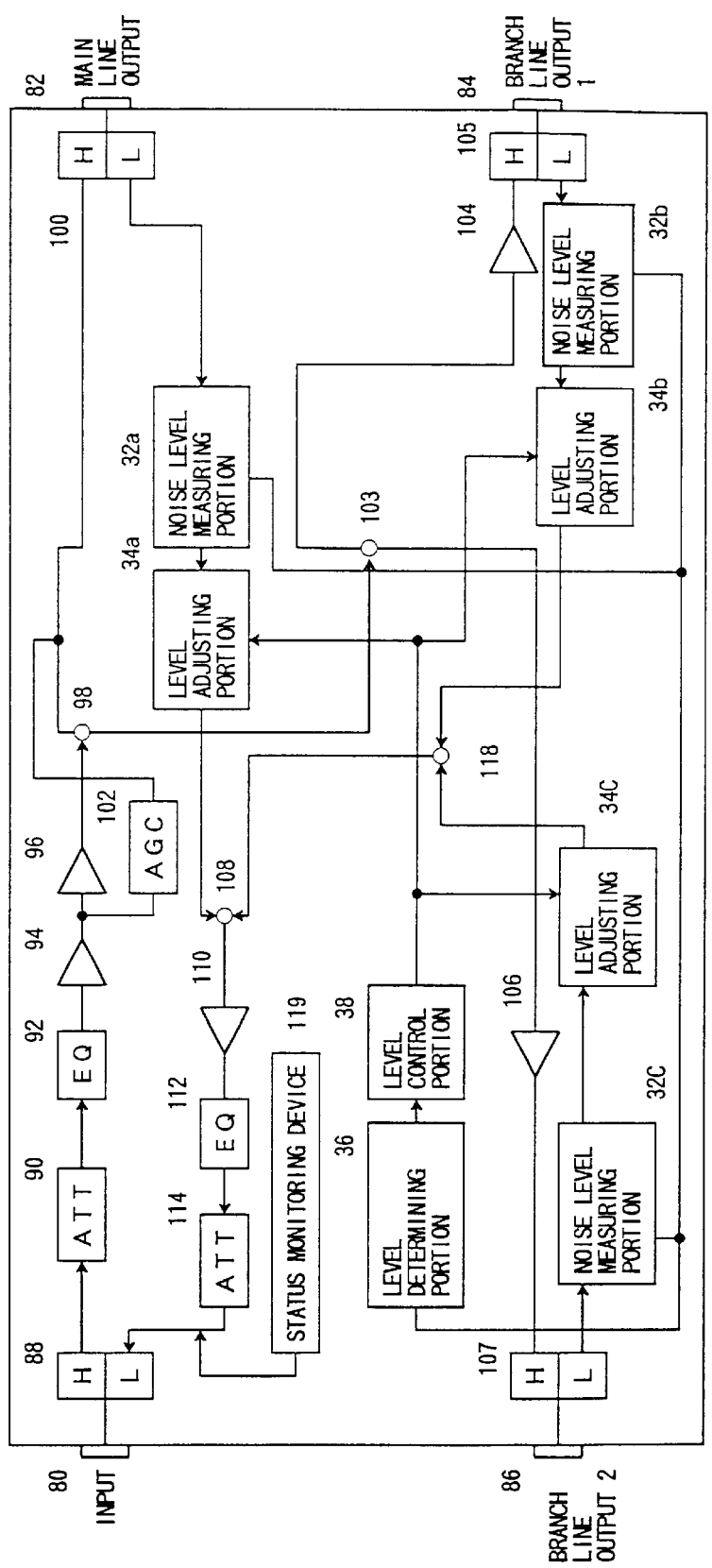

FIG. 12 is block diagram showing one embodiment of transmission-line amplifiers built in the upward-joining-noise decreasing apparatus according to the present invention. These transmission-line amplifiers are used as substitutes for those shown in FIG. 2. In FIG. 12, parts, which are the same as those in FIG. 4, are given the same reference numerals. As shown in FIG. 12, a terminal 80 is coupled to an upstream of a transmission line and a terminal 82 is coupled to a downstream of the transmission line. Also, terminals 84 and 86 are branch terminals coupled to the subscriber terminals 14, respectively.

The terminal 80 is coupled to a filter 88 and a downward signal from the terminal 80 is provided as a high-band output of the filter 88. Then, the down signal passes through an attenuator 90 and an equalizer 92, and is amplified by amplifiers 94 and 96. After that, the down signal passes through a branch circuit 98 and a filter 100 and is thus outputted from the terminal 82. Also, an AGC (automatic gain control) circuit 102 controls an output level of the amplifier 96 so as to make it constant. Moreover, the down signal, after branching off at the branch circuit 98, further branches off at a branch circuit 103 such that one part thereof is outputted from the terminal 84 by passing through an amplifier 104 and a filter 105 and the other part thereof is outputted from the terminal 86 by passing through an amplifier 106 and a filter 107.

An upward signal from the terminal 82 is provided as a low-band output of the filter 100. Then the upward signal passes through the noise measuring portion 32a and the level adjusting portion 34a and is mixed with another upward signal from a subscriber terminal at a mixing circuit 108. After that, a mixed upward signal passes through an amplifier 110, an equalizer 112, an attenuator 114, and the filter 88 and is thus outputted from the terminal 80.

An upward signal from the terminal 84 is obtained as a low-band output of a filter 105. Then the upward signal passes through the noise measuring portion 32b and the level adjusting portion 34b and is mixed with another upward signal from another system at a mixing circuit 118. An upward signal from the terminal 86 is provided as a low-band output of a filter 107. Then the upward signal passes through the noise measuring portion 32c and the level adjusting portion 34c and is supplied to the mixing circuit 118.

In addition, a status monitoring device 119 serves to monitor statuses of the amplifiers 94, 96 and 110 or of the level determining portion 36 so as to output a monitoring result as a STM (status monitoring) signal. The STM signal is mixed with the upward signal and supplied to the center device 18.

The DU ratios of the upward signals, which are measured at the noise measuring portions 32a through 32c, are supplied to the level determining portion 36 which generates the level control signals corresponding to the respective upward signals for controlling the level of every upward signal and supplies them to the level control portion 38. The level control portion 38, according to these level control signals, respectively controls the level adjusting portions 34a through 34c so as to adjust each of the upward signals.

Figure 13:
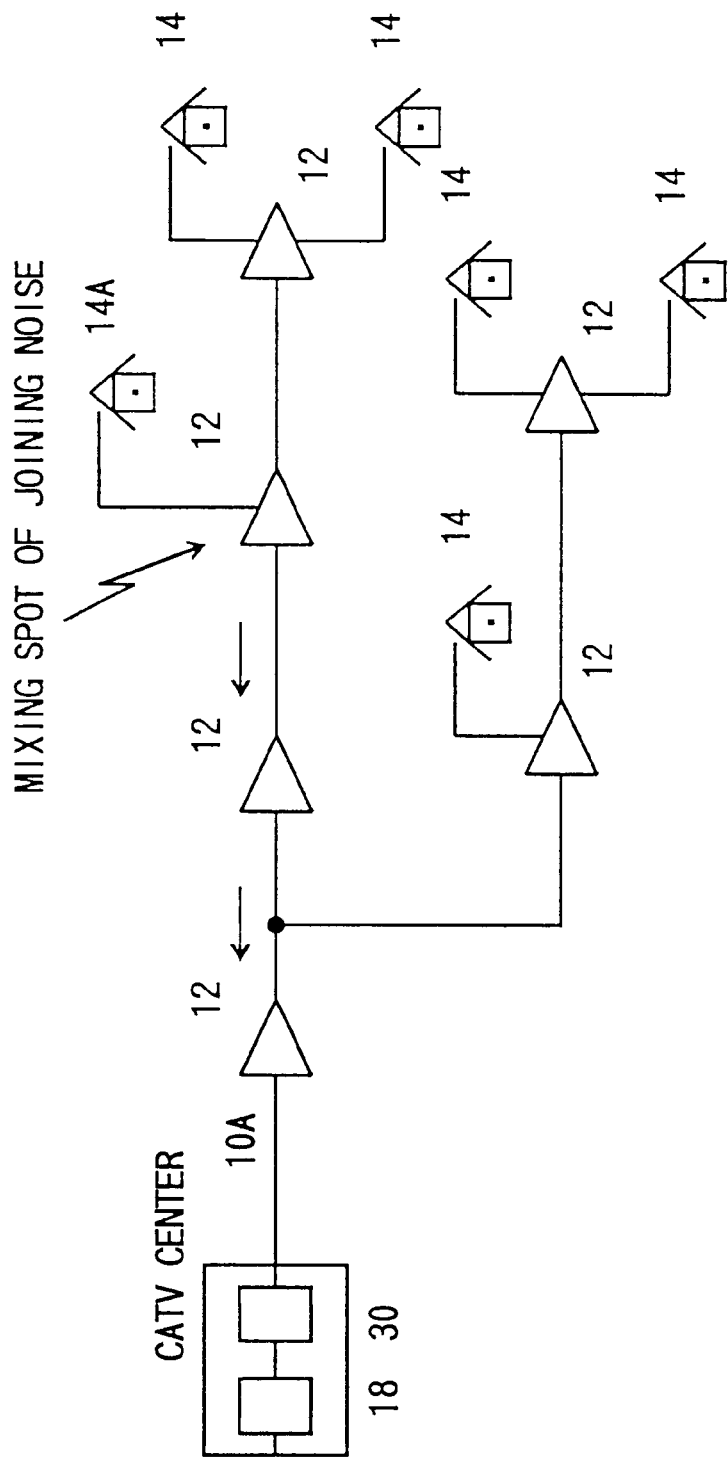
FIG. 13 shows a CATV transmission system applicable to the embodiment in FIG. 4.

FIG. 13 shows the CATV transmission system applicable to the embodiment in FIG. 4. And FIG. 14 shows the CATV transmission system applicable to the transmission-line amplifier 120 in FIG. 12.

As shown FIG. 13, there are a plurality of subscriber terminals 14 and 14A coupled to the transmission line 10A and, for example, in a case where an upward signal from the subscriber terminal 14A includes a high noise level, the output levels of all of the subscribe terminals 14 coupled to the line 10A are increased when the upward-joining-noise decreasing apparatus 30 decreases attenuation for the transmission line 10A.

Figure 14:
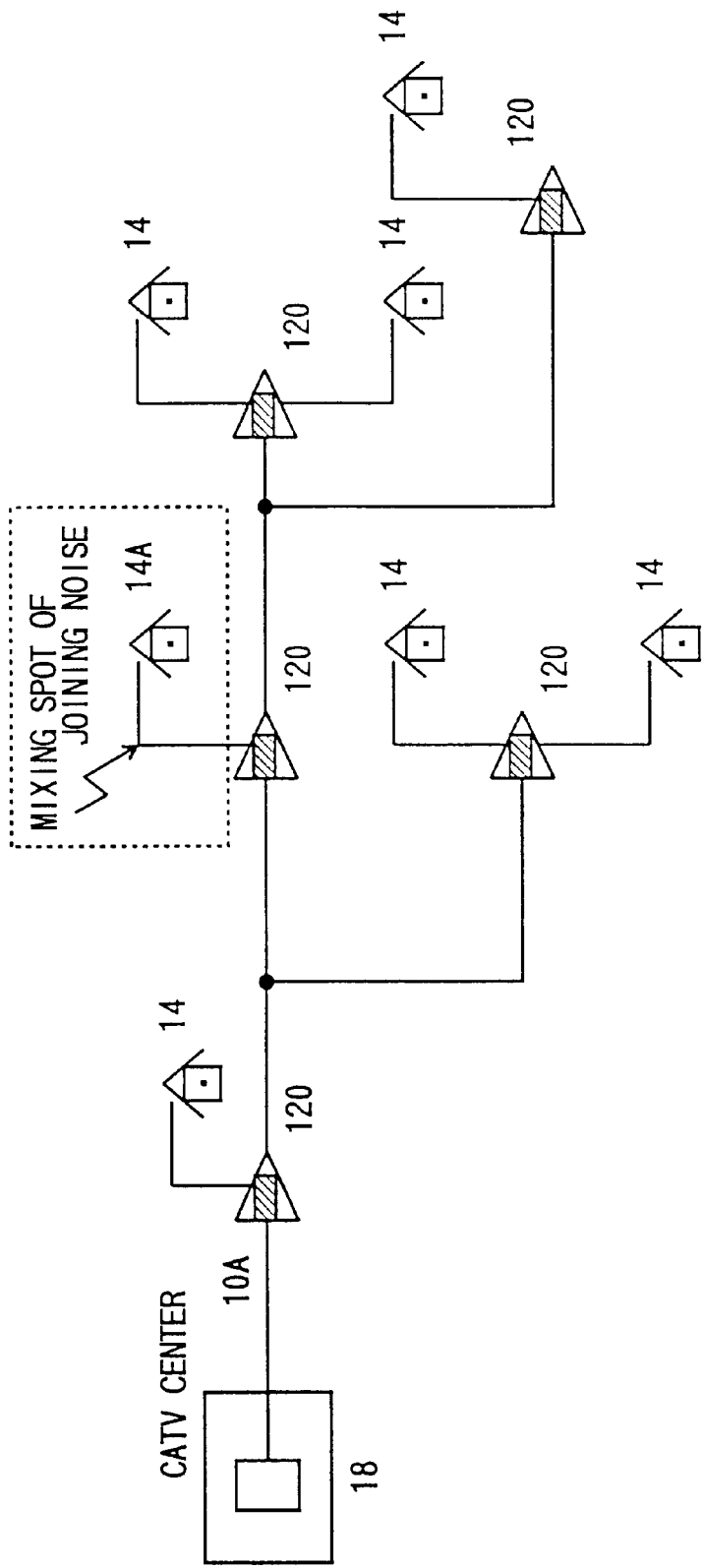
FIG. 14 shows a CATV transmission system applicable to the transmission-line amplifier of FIG. 12.

As shown in FIG. 14, on the other hand, since the upward-joining-noise decreasing apparatus is built into the transmission-line amplifier 120, in a case where, for example, the upward signal from the subscriber terminal 14A includes a high noise level, the attenuation can be decreased for the subscriber terminal 14A only at the amplifier 120 to which the subscriber terminal 14A is coupled. For this reason, the output level of the subscriber terminal 14A is increased but the output levels of the other subscriber terminals 14 are not changed. Therefore the other subscriber terminals 14 are less likely to interfere with upward signals on other transmission lines and such a CATV system has a better practical use.

The above description is provided in order to enable any person skilled in the art to make and use the invention and sets forth the best mode contemplated by the inventors for carrying out their invention.

The present application is based on Japanese priority application No. 11-171614 filed on Jun. 17, 1999, the entire contents of which are hereby incorporated by reference.

What is claimed is:

1. A method for decreasing upward-joining-noise in a two-way communication system connected by a plurality of transmission lines between a center device and a plurality of subscriber terminals, said upward-joining-noise decreasing method comprising the steps of:

in an upward-signal-inputting position of said center device,
  (a) measuring a desired to undesired signal ratio of each of a plurality of upward signals inputted from the plurality of transmission lines;
  (b) determining whether said measured desired to undesired signal ratio of each inputted upward signal is greater than a predetermined value;
  (c) controlling a an output level for each inputted upward signal based on a result obtained from said determining step (b); and
  (d) adjusting said output level for each inputted upward signal according to said controlling step (c).

2. The upward-joining-noise decreasing method as claimed in claim 1, wherein said level adjusting step (d) performs an output level adjustment such that attenuation of an inputted upward signal, for which the desired to undesired signal ratio of said inputted upward signal is greater than the predetermined value, is decreased.

3. The upward-joining-noise decreasing method as claimed in claim 2, wherein said level adjusting step (d) performs an output level adjustment such that said attenuation of said inputted upward signal is decreased by more than three stages.

4. A method for decreasing upward-joining-noise in a two-way communication system connected by a plurality of transmission lines between a center device and a plurality of subscriber terminals, said upward-joining-noise decreasing method comprising the steps of:

at a plurality of transmission-line amplifiers provided on the plurality of transmission lines,
  (a) measuring a desired to undesired signal ratio of each of a plurality of upward signals inputted from the plurality of transmission lines and the plurality of subscriber terminals;
  (b) determining whether said measured desired to undesired signal ratio of each inputted upward signal is greater than a predetermined value;
  (c) controlling an output level for each inputted upward signal based on a result obtained from said determining step (b); and
  (d) adjusting said output level for each inputted upward signal according to said controlling step (c).

5. The upward-joining-noise decreasing method as claimed in claim 4, wherein said level adjusting step (d) performs an output level adjustment such that attenuation of an inputted upward signal, for which the desired to undesired signal ratio of said inputted upward signal is greater than the predetermined value, is decreased.

6. The upward-joining-noise decreasing method as claimed in claim 5, wherein said level adjusting step (d) performs an output level adjustment such that said attenuation of said inputted upward signal is decreased by more than three stages.

7. An upward-joining-noise decreasing apparatus used in a two-way communication system connected by a plurality of transmission lines between a center device and a plurality of subscriber terminals, said upward-joining-noise decreasing apparatus, which is mounted in an upward-signal-inputting position of said center device, comprising:

a plurality of level measuring portions, each for measuring a desired to undesired signal ratio of each of a plurality of upward signals inputted from the plurality of transmission lines;

a level determining portion for determining whether said measured desired to undesired signal ratio of each inputted upward signal is greater than a predetermined value;

a level control portion for controlling an output level for each inputted upward signal based on a result obtained from said level determining portion; and a plurality of level adjusting portions, each for adjusting said output level of one of the plurality of inputted upward signals according to said level control portion.

8. The upward-joining-noise decreasing apparatus as claimed in claim 7, wherein said level adjusting portion performs an output level adjustment such that attenuation of an inputted upward signal, for which the desired to undesired signal ratio of said inputted upward signal is greater than the predetermined value, is decreased.

9. The upward-joining-noise decreasing method as claimed in claim 8, wherein said level adjusting step (d) performs an output level adjustment such that said attenuation of said inputted upward signal is decreased by more than three stages.

10. An upward-joining-noise decreasing apparatus used in a two-way communication system connected by a plurality of transmission lines between a center device and a plurality of subscriber terminals, said upward-joining-noise decreasing apparatus, which is provided in each of a plurality of transmission-line amplifiers provided on the plurality of transmission lines, comprising:

a plurality of level measuring portions, each for measuring a desired to undesired signal ratio of each of a plurality of upward signals inputted from the plurality of transmission lines and the plurality of subscriber terminals;

a level determining portion for determining whether said measured desired to undesired signal ratio of each inputted upward signal is greater than a predetermined value;

a level control portion for controlling an output level of each inputted upward signal based on a result obtained from said level determining portion; and a plurality of level adjusting portions, each for adjusting said output level of one of the plurality of inputted upward signals according to said level control portion.

11. The upward-joining-noise decreasing apparatus as claimed in claim 10, wherein said level adjusting portion performs an output level adjustment such that attenuation of an inputted upward signal, for which the desired to undesired signal ratio of said inputted upward signal is greater than the predetermined value, is decreased.

12. The upward-joining-noise decreasing method as claimed in claim 11, wherein said level adjusting step (d) performs an outputlevel adjustment such that said attenuation of said inputted upward signal is decreased by more than three stages.

* * * * *